(12) United States Patent
Kong et al.

(10) Patent No.: US 9,483,194 B2
(45) Date of Patent: *Nov. 1, 2016

(54) FILE PROCESSING METHOD AND APPARATUS, AND STORAGE DEVICE

(71) Applicant: HUAWEI TECHNOLOGIES CO., LTD., Shenzhen, Guangdong (CN)

(72) Inventors: Han Kong, Chengdu (CN); Jing Wang, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/568,502

(22) Filed: Dec. 12, 2014

(65) Prior Publication Data

US 2015/0100729 A1    Apr. 9, 2015

Related U.S. Application Data

(63) Continuation of application No. PCT/CN2013/081182, filed on Aug. 9, 2013.

(51) Int. Cl.
*G06F 3/00* (2006.01)
*G06F 3/06* (2006.01)

(52) U.S. Cl.
CPC .............. *G06F 3/0619* (2013.01); *G06F 3/064* (2013.01); *G06F 3/0625* (2013.01); *G06F 3/0643* (2013.01); *G06F 3/0689* (2013.01); *Y02B 60/1246* (2013.01)

(58) Field of Classification Search
None
See application file for complete search history.

(56) References Cited

U.S. PATENT DOCUMENTS

| 5,860,090 A | 1/1999 | Clark et al. |
| 5,878,280 A | 3/1999 | Lucht |
| 6,311,251 B1 | 10/2001 | Merritt et al. |

(Continued)

FOREIGN PATENT DOCUMENTS

| CN | 101055509 A | 10/2007 |
| CN | 101976175 A | 2/2011 |

(Continued)

OTHER PUBLICATIONS

Colarelli, D. et al., 'Massive arrays of idle disks for storage archives', Proceedings of the 2002 ACM/IEEE conference on Supercomputing. IEEE Computer Society Press, Jul. 26, 2002. total 11 pages.

(Continued)

*Primary Examiner* — David X Yi
*Assistant Examiner* — Craig Goldschmidt
(74) *Attorney, Agent, or Firm* — Huawei Technologies Co., Ltd.

(57) ABSTRACT

A file processing method and a storage device for storing a file in a redundant array of independent disks (RAID) are disclosed. In this method, the storage device divides received F files into multiple data blocks, and obtains a first matrix with T rows according to the multiple data blocks. Data blocks belonging to one file are located in one row of the first matrix. The storage device then writes a stripe, which consists of data blocks in each column in the first matrix and a check block that is obtained by computing according to the data blocks in the column, into the RAID. By using the file processing method, the storage device can write one file into one disk of the RAID while ensuring security of file storage, thereby achieving a better energy saving effect when the file is read.

12 Claims, 13 Drawing Sheets

(56) References Cited

U.S. PATENT DOCUMENTS

| | | | |
|---|---|---|---|
| 7,237,062 B2 | 6/2007 | Lubbers et al. | |
| 8,006,111 B1 | 8/2011 | Faibish et al. | |
| 8,448,021 B1 | 5/2013 | Bonwick | |
| 8,554,997 B1* | 10/2013 | Bonwick | G06F 3/0689 |
| | | | 711/111 |
| 2003/0120863 A1* | 6/2003 | Lee | G06F 11/1084 |
| | | | 711/114 |
| 2003/0182502 A1 | 9/2003 | Kleiman et al. | |
| 2009/0204758 A1 | 8/2009 | Luning | |
| 2012/0151253 A1* | 6/2012 | Horn | G06F 12/0804 |
| | | | 714/6.22 |
| 2012/0159067 A1* | 6/2012 | Kelton | G06F 11/1076 |
| | | | 711/113 |
| 2013/0091237 A1 | 4/2013 | Arulambalam et al. | |

FOREIGN PATENT DOCUMENTS

| | | |
|---|---|---|
| CN | 102880428 A | 1/2013 |
| JP | 07152498 A | 6/1995 |
| JP | 11288359 A | 10/1999 |
| JP | 11288387 A | 10/1999 |
| JP | 2004145409 A | 5/2004 |
| JP | 2006260582 A | 9/2006 |
| JP | 2010079928 A | 4/2010 |
| WO | 9429796 A1 | 12/1994 |

OTHER PUBLICATIONS

Pinheiro E. et al., 'Energy Conservation Techniques for Disk Array-Based Servers', ICS'04, 2004, Malo, France; total 11 pages.

* cited by examiner

FILE PROCESSING METHOD AND APPARATUS, AND STORAGE DEVICE

CROSS-REFERENCE TO RELATED APPLICATIONS

This application is a continuation of International Application No. PCT/CN2013/081182, filed on Aug. 9, 2013, which is hereby incorporated by reference in its entirety.

TECHNICAL FIELD

The present invention relates to the field of communications technologies, and in particular, to a file processing method and apparatus, and a storage device.

BACKGROUND

A redundant array of independent disks (RAID), also known as a redundant array of inexpensive disks (RAID), is called a disk array for short. A principle of a RAID is to form a disk array group by combining a plurality of relatively inexpensive disks, so as to make performance reach or even exceed that of an expensive hard disk with a huge capacity; in addition, data security is improved in combination with a design of distributed data arrangement. According to a different version that is selected, a RAID, compared with a single disk, can not only enlarge a storage capacity but also enhance a data integration level and a data fault tolerance capability. In addition, for a computer, a disk array looks like an independent disk or a logical storage unit.

In an archiving scenario, many files need to be archived. Therefore, in the prior art, a RAID is generally used to store an archived file, and in order to improve data security, a RAID with a check function, for example, in a form of a RAID3, a RAID4, a RAID5, or a RAID6, is generally used to store an archived file. In the prior art, in order to improve a data access speed, a file is generally divided into several data blocks, and a plurality of data blocks belonging to one file, and a check block form a stripe of a RAID, and the stripe is written into a plurality of disks that forms the RAID. Because an archived file is less frequently accessed, in order to achieve an energy saving purpose, a disk in a storage system is generally in a dormant or power-off state after a file is archived. Only when an archived file needs to be accessed, a plurality of disks in which data blocks of the file are stored is wakened up or powered on, so as to read the file.

SUMMARY

Embodiments of the present invention provide a file processing method and apparatus, and a storage device, which can store one file in one disk of a RAID while ensuring security of file storage, and can achieve an energy saving effect.

According to a first aspect, an embodiment of the present invention provides a file processing method performed by a storage device for storing a file in a redundant array of independent disks (RAID). In the method, the storage device receives F files that are to be stored in the RAID, where the RAID is formed by T disks, and T is a natural number no less than 3. After divides the F files into data blocks according to a strip size of the RAID, The storage device obtains a first matrix with T rows according to the data blocks, where data blocks belonging to one file are located in one row in the first matrix. Then, the storage device writes a stripe, which consists of data blocks in each column in the first matrix and a check block that is obtained by computing according to the data blocks in the column, into the T disks that form the RAID.

According to a second aspect, an embodiment of the present invention provides a file processing method. The method is applied to a storage device for storing a file in a redundant array of independent disks (RAID). In the method, the storage device receives F files that are to be stored in the RAID, where. After dividing the F files into data blocks according to a strip size of the RAID, the storage device arranges the data blocks into an array, where in the array, there is an interval of D−1 positions between two adjacent data blocks belonging to one file, and a value of the D is the quantity of data disks in the RAID. Then, the storage device writes a stripe, which consists of D data blocks of the array and P check blocks which are obtained by computing according to the D data blocks, into disks that form the RAID, where a value of the P is the quantity of independent check disks in the RAID.

According to a third aspect, an embodiment of the present invention provides a storage device. The storage device includes a controller and a redundant array of independent disks (RAID). The RAID is configured to store a file. The controller includes a communication interface and a processor. The communication interface is configured to communicate with a host and the RAID. The processor is configured to receive F files that are to be stored in the redundant array of independent disks (RAID), where F is a natural number no less than 2. After divides the F files into data blocks according to a strip size of the RAID, the processor is configured to obtain a first matrix with T rows according to the data blocks, where data blocks belonging to one file are located in one row in the first matrix. Then, the processor is configured to write a stripe, which consists of data blocks in each column in the first matrix and a check block that is obtained by computing according to the data blocks in the column, into the T disks that form the RAID.

According to a fourth aspect, an embodiment of the present invention provides a storage device. The storage device includes a redundant array of independent disks (RAID) and a controller. The RAID is configured to store a file. The controller is configured to receive F files that are to be stored in the RAID and to divide the F files into data blocks according to a strip size of the RAID, where F is a natural number no less than 2. After arranges the data blocks into an array, the controller is configured to write a stripe, which consists of D data blocks of the array and P check blocks which are obtained by computing according to the D data blocks, into disks that form the RAID, where in the array, there is an interval of D−1 positions between two adjacent data blocks belonging to one file, a value of the D is the quantity of data disks in the RAID, and a value of the P is the quantity of independent check disks in the RAID.

According to a fifth aspect, an embodiment of the present invention provides a computer program product, including a computer readable storage medium stored with program code, where an instruction included in the program code is used to execute the file processing method according to the first aspect or the second aspect.

In the file processing methods provided in the embodiments of the present invention, a storage device divides received F files into multiple data blocks, and obtains a first matrix with T rows according to the multiple data blocks. Data blocks belonging to one file are located in one row of the first matrix. The storage device forms a stripe by using data blocks in each column in the first matrix and a check block that is obtained by computing according to the data blocks in the column, and stores the stripe in a RAID, so that the data blocks belonging to the same file can be stored in one disk of the RAID. In addition, when a file is damaged, the storage device may restore the damaged file according to other files and a check block, thereby ensuring security of file storage. Further, in an archiving scenario, when a file in the RAID needs to be accessed, the storage device only needs to wake up and operate one disk in which the file is stored, which leads to an evident energy saving effect.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention.

DESCRIPTION OF EMBODIMENTS

To make persons skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention.

Figure 1A:
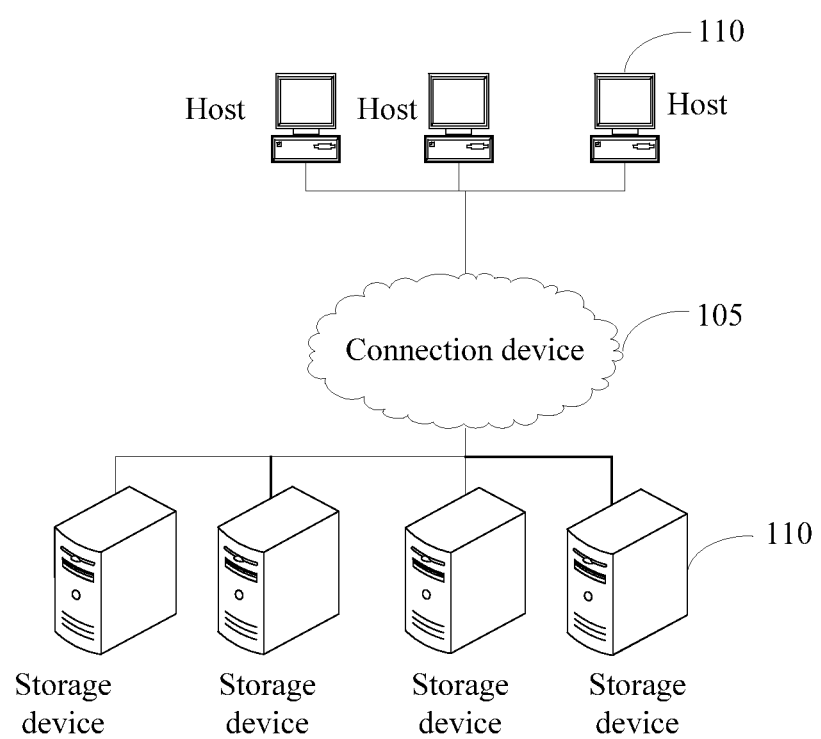
FIG. 1A is a diagram of an application scenario of a file processing method according to an embodiment of the present invention.

As shown in FIG. 1A, FIG. 1A is a diagram of an application scenario according to an embodiment of the present invention. In the application scenario shown in FIG. 1A, a storage system includes a host 100, a connection device 105, and a storage device 110.

The host 100 may include any computing device known in the prior art, for example, an application server or a desktop computer. An operating system and other application programs are installed in the host 100, and there may be multiple hosts 100.

The connection device 105 may include any interface, between a storage device and a host, known in the prior art, such as a fiber switch or another existing switch.

The storage device 110 may include a storage device known in the prior art, for example, a storage array, a Just a Bunch Of Disks (JBOD), or one or more interconnected disk drives of a direct access storage device (DASD), where the direct access storage device may include a tape library or a tape storage device of one or more storage units.

Figure 1B:
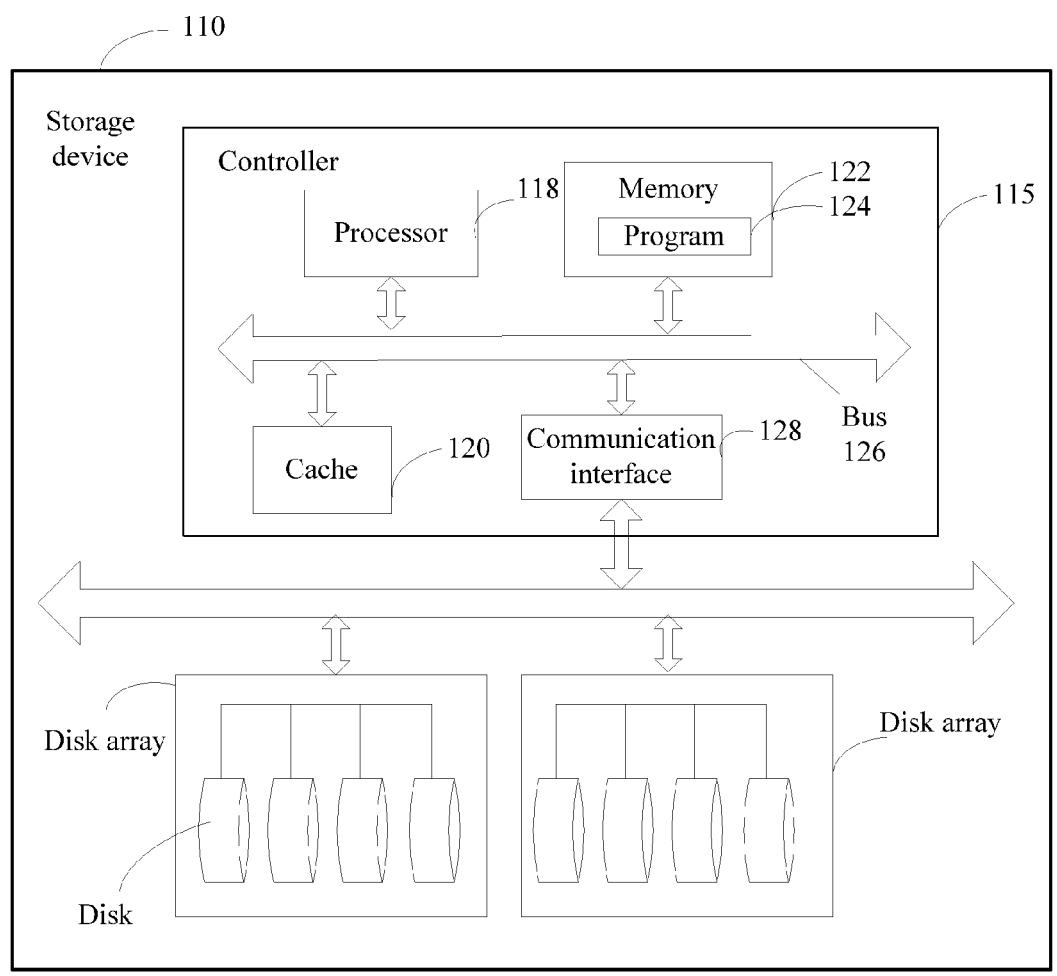
FIG. 1B is a schematic structural diagram of a storage device 110 according to an embodiment of the present invention.

FIG. 1B is a schematic structural diagram of a storage device 110 according to an embodiment of the present invention, and the storage device shown in FIG. 1B is a storage array. As shown in FIG. 1B, the storage device 110 may include a controller 115 and a disk array 125, where the disk array herein refers to a redundant array of independent disks (RAID). There may be multiple disk arrays 125, and the disk array 125 is formed by multiple disks 130.

The controller 115 is a "brain" of the storage device 110, and mainly includes a processor 118, a cache 120, a memory 122, a communication bus (bus for short) 126, and a communication interface 128. The processor 118, the cache 120, the memory 122, and the communication interface 128 communicate with each other by using the communication bus 126.

The communication interface 128 is configured to communicate with the host 100 and the disk array 125.

The memory 122 is configured to store a program 124, and the memory 122 may include a high-speed RAM memory, or may include a non-volatile memory, for example, at least one disk memory. It may be understood that the memory 122 may be any non-transitory machine-readable medium capable of storing program code, such as a random-access memory (RAM), a magnetic disk, a hard disk, a USB flash drive, a removable hard disk, an optical disc, a solid state disk (SSD), or a non-volatile memory.

The program 124 may include program code, where the program code includes a computer operation instruction.

The cache 120 is configured to buffer data received from the host 100 and buffer data read from the disk array 125, so as to improve performance and reliability of the array. The cache 120 may be any non-transitory machine-readable medium capable of storing data, such as a RAM, a ROM, a flash memory, or a solid state disk (SSD), which is not limited herein.

The processor 118 may be a central processing unit CPU, or an application specific integrated circuit ASIC, or be configured as one or more integrated circuits that implement this embodiment of the present invention. An operating system and other software programs are installed in the processor 118, and different software programs may be considered as a processing module with different functions, for example, processing an input/output (I/O) request for a disk 130, performing other processing on data in the disk, or modifying metadata stored in the storage device. Therefore, the controller 115 can implement an IO operation and a RAID management function, and can also provide various data management functions, such as snapshotting, mirroring, and copying. In this embodiment of the present invention, the processor 118 is configured to execute the program 124, and may specifically perform relevant steps in the following method embodiments.

With reference to FIG. 1A, any storage device 110 may receive, by using the connection device 105, multiple files sent by one or more hosts 100, divide the received multiple files into multiple data blocks, and store the data blocks in multiple disks 130 that form the disk array 125. Any storage device 110 may also receive a file read request sent by any host 100, and return a data block of the file stored in the disk 130 to the host according to the file read request.

It should be noted that the disk 130 is merely an example of storage apparatuses that form the disk array 125, and in an actual application, there may be an implementation manner that a disk array is formed between cabinets including multiple disks. Therefore, the storage apparatus in this embodiment of the present invention may include any apparatus such as a magnetic disk, a solid state disk (SSD), or a cabinet or server formed by multiple magnetic disks, which is not limited herein.

Figure 2A:
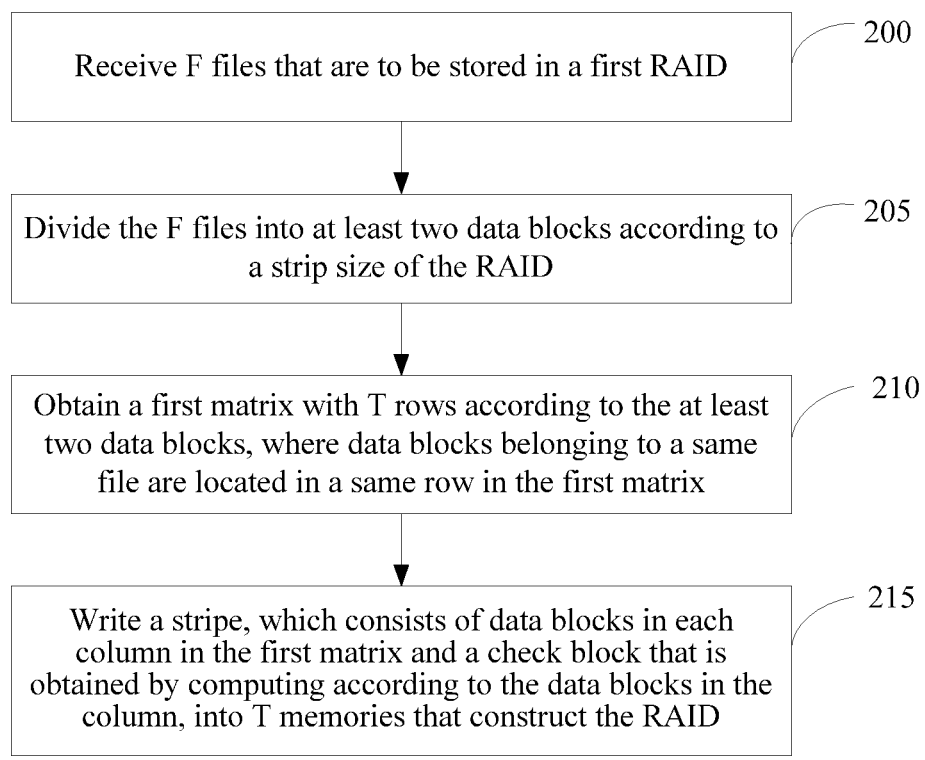
FIG. 2A is a flowchart of a file processing method according to an embodiment of the present invention.

FIG. 2A is a flowchart of a file processing method according to an embodiment of the present invention. The method may be executed by the controller 115 of the storage device 110 shown in FIG. 1B, and the method may be applied to a file archiving scenario. As shown in 2-A, the method includes:

In step 200, the storage device 110 receives F files that are to be stored in a RAID, where F is a natural number no less than 2. In this embodiment of the present invention, the controller 115 of the storage device 110 may receive a file storage request sent by one or more hosts 100, the file storage request is used to request to store a file in a first RAID of the storage device 110, and a first storage request may include the F to-be-stored files. The first RAID includes T storage apparatuses, and a value of T is a natural number no less than 3.

With reference to FIG. 1B, the storage device 110 may include multiple RAIDs. The first RAID or a second RAID described in this embodiment is any one of the multiple RAIDs included in the storage device 110. The first RAID and the second RAID in this embodiment of the present invention are merely intended to distinguish different RAIDs. An organization form of multiple RAIDs included in the same storage device 110 may be the same, for example, both the first RAID and the second RAID are in an organization form of a RAID5. Certainly, the organization form of the multiple RAIDs included in the same storage device 110 may be different, for example, the first RAID is a RAID3, and the second RAID is a RAID5, which is not limited herein. It may be understood that in an actual operation, the received F files may be first buffered in the cache 120, and after being processed, the F files are written into the disk array 125.

In step 205, the storage device 110 divides the F files into at least two data blocks according to a strip size of the first RAID. A strip is a continuous address block in an extent. In a disk array, the controller generally maps a block address of a virtual disk to a block address of a member disk by using a strip. A strip is also called a stripe element. A strip size, sometimes also called a block size, a chunk size, or granularity, refers to a size of a strip data block written to each disk. Generally, a strip size of a RAID is between 2 KB to 512 KB (or greater), and a value of the strip size is 2 to the power of n, for example, 2 KB, 4 KB, 8 KB, 16 KB, or the like.

Figure 4A:
FIG. 4A, FIG. 4B, and FIG. 4C are schematic diagrams of an arrangement of data blocks of to-be-stored files according to an embodiment of the present invention.

When the received files are divided according to the strip size of the first RAID, and if a size of a file is less than the strip size of the first RAID, the file may be used as one data block. If a remaining data block after a file is divided is less than the value of the strip size, remaining data of the file is used as one data block. For example, as shown in FIG. 4A, the controller 115 receives 5 to-be-stored files F1-F5. After being divided according to the strip size of the first RAID, the file F1 is divided into 5 data blocks: F1-1, F1-2, F1-3, F1-4, and F1-5. The file F2 is divided into 3 data blocks: F2-1, F2-2, and F2-3. The file F3 is divided into one data block: F3-1. The file F4 is divided into 5 data blocks: F4-1, F4-2, F4-3, F4-4, and F4-5. The file F5 is divided into 4 data blocks: F5-1, F5-2, F5-3, and F5-4.

In step 210, the storage device 110 obtains a first matrix with T rows according to the at least two data blocks, where data blocks belonging to one file are located in one row of the first matrix. In addition, each column in the first matrix includes a check block obtained by computing according to the data blocks in the column, and a value of T is equal to the quantity of disks that form the first RAID.

Figure 4B:
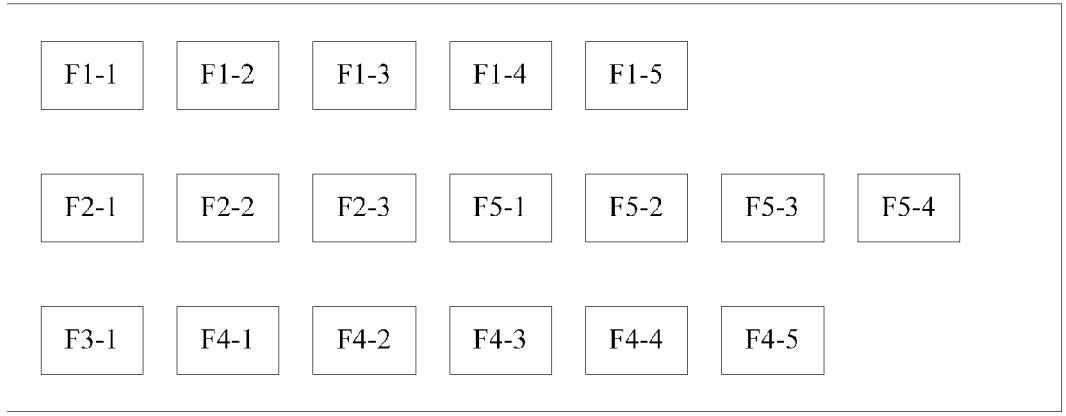
Figure 4C:
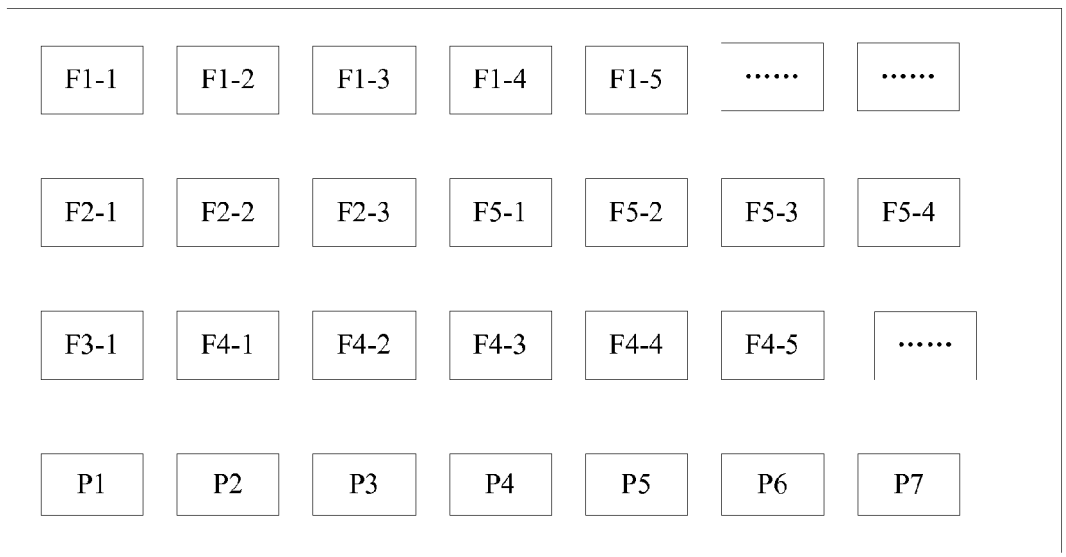

For example, if the first RAID has a total of 4 disks, a first matrix with 4 rows may be obtained according to the foregoing data blocks obtained by dividing the files F1-F5, and data blocks belonging to one file are located in one row in the first matrix. As shown in FIG. 4C, the data blocks F1-1, F1-2, F1-3, F1-4, and F1-5 of the file F1 are all located in the $0^{th}$ row of the first matrix, and the data blocks F2-1, F2-2, and F2-3 of the file F2 are all located in the $1^{st}$ row of the second matrix.

Specifically, in the process of obtaining the first matrix, a first data block of the first file may be determined as a data block located at a position A[0, 0] in the first matrix, and whether a second data block belongs to the first file is determined. If the second data block belongs to the first file, the second data block is arranged in the same row as the first data block; if the second data block does not belong to the first file, the second block is arranged in a blank row that is first found, or the second data block is arranged in a shortest row of the second matrix; and other data blocks are processed by analogy until all data blocks obtained by dividing are arranged. Certainly, it may be understood that another method may be used to arrange the data blocks obtained, by dividing, into the first matrix, as long as it is guaranteed that data blocks belonging to one file are located in one row in the first matrix, which is not limited herein. The first matrix with T rows after arrangement may be shown in FIG. 4C, or FIG. 6B.

In each column in the first matrix with T rows after arrangement, a check block obtained by computing according to the data blocks in the column is included, for example, in the first matrix shown in FIG. 4C, the $0^{th}$ column includes a check block P1 that is obtained according to the data blocks in the $0^{th}$ column: F1-1, F2-1, and F3-1; and the $1^{st}$ column includes a check block P2 that is obtained according to the data blocks in the $1^{st}$ column: F1-2, F2-2, and F3-2.

In this embodiment of the present invention, a specific position in which a file is located in the first matrix is not limited, and an arrangement sequence of the data blocks belonging to one file is not limited either, as long as it is guaranteed that data blocks of one file are located in one row of the first matrix. In an actual application, data blocks belonging to one file may be arranged sequentially in one row of the first matrix.

In step 215, the storage device 110 writes a stripe, which consists of data blocks in each column in the first matrix and the check block that is obtained by computing according to the data blocks in the column, into the T storage apparatuses that form the first RAID.

Figure 4D:
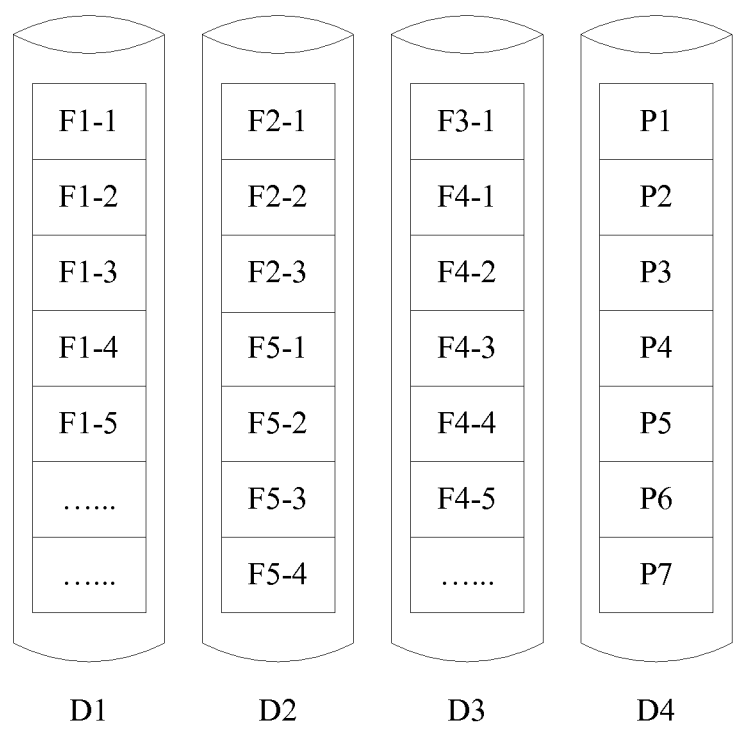
FIG. 4D is a schematic diagram of a file storage structure according to an embodiment of the present invention.
Figure 6A:
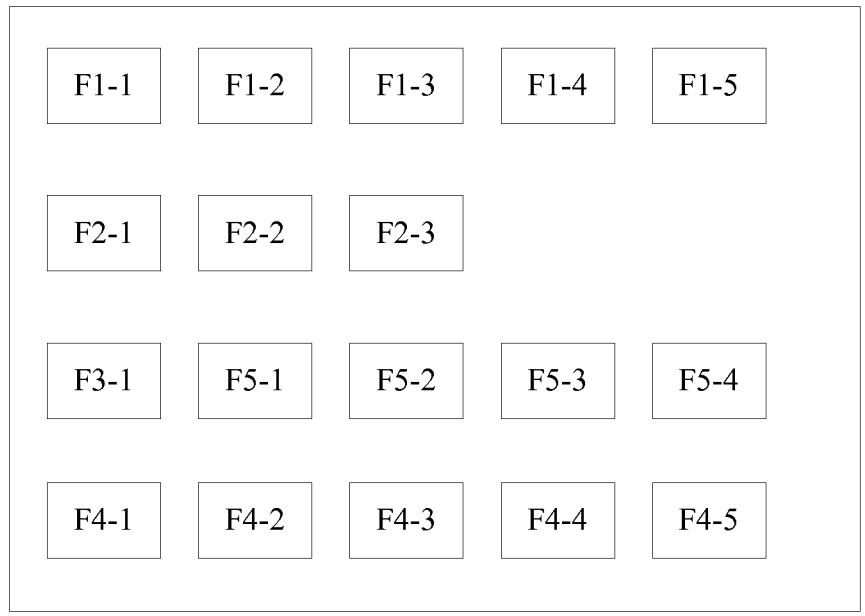
FIG. 6A, FIG. 6B, and FIG. 6D are schematic diagrams of another arrangement of data blocks of to-be-stored files according to an embodiment of the present invention.
Figure 6B:
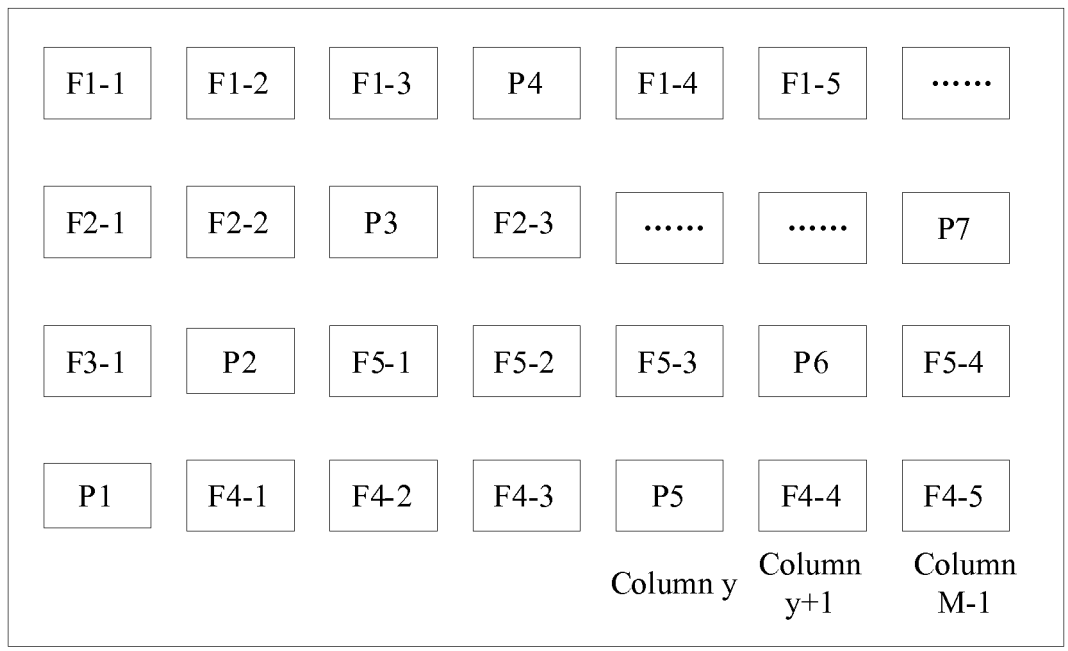
Figure 6C:
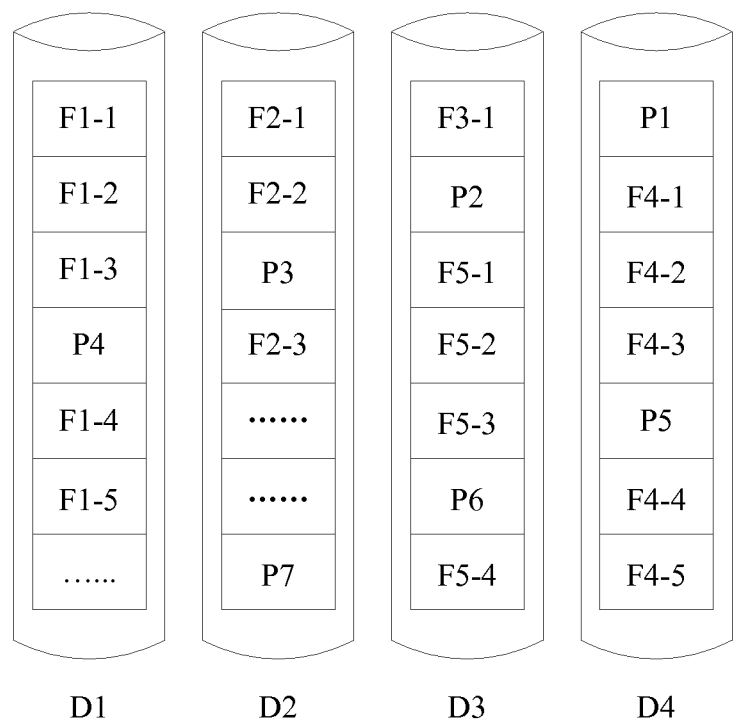
FIG. 6C is a schematic diagram of another file storage structure according to an embodiment of the present invention.

After the first matrix is obtained, a stripe of the RAID may consist of the data blocks in each column in the first matrix and the check block that is obtained by computing according to the data blocks in the column, and the stripe may be written into disks that form the first RAID. For example, in a situation, after stripes, which respectively consist of data blocks in each column in the first matrix and a check block that is obtained by computing according to the data blocks in the column shown in FIG. 4C, are written into a disk, a storage structure shown in FIG. 4D is formed. F1-1, F2-1, F3-1, and P1 form a stripe of the first RAID, and F1-2, F2-2, F3-2, and P2 form another stripe of the first RAID, and so on. In another situation, after stripes, which respectively consist of data blocks in each column in the first matrix and a check block that is obtained by computing according to the data blocks in the column shown in FIG. 6B, are written into a disk, a storage structure shown in FIG. 6C may be formed. It should be noted that the stripe described in this embodiment of the present invention refers to a collection of data blocks that are concurrently written into each of storage apparatuses that form the RAID, where a size of each data block in the stripe is the same, and data blocks in one stripe are located in one displacement position of each storage apparatus.

It may be understood that in an actual application, data blocks in a column in the first matrix shown in FIG. 4C or FIG. 6B may be computed to obtain a check block in the column. After the check block is inserted into the column, a stripe, which consists of the data blocks in the column and the check block, is stored in the disks that form the first RAID. Optionally, after a check block in each column of the first matrix is all obtained by computing, a stripe may be formed respectively by using the data blocks in each column in the first matrix and the check block that is obtained by computing according to the data blocks in the column, and the stripe is stored in the disks that form the first RAID. For example, after the check block P1 is first obtained by computing according to the data blocks F1-1, F2-1, and F3-1 in the $0^{th}$ column in the first matrix shown in FIG. 4C, a stripe, which consists of the data blocks F1-1, F2-1, and F3-1 in the $0^{th}$ column and P1 that are shown in FIG. 4C, is stored in disks D1-D4 that form the first RAID. Optionally, after the check blocks P1-P7 are all obtained by computing, stripes, which consist of the data blocks in each column in the first matrix and the check block respectively, are stored in the disks D1-D4, which is not limited herein.

It may be known from the foregoing description that in the file processing method described in this embodiment of the present invention, after to-be-stored files are divided and arranged, stripes which consist of data blocks belonging to different files are stored in disks that form a first RAID, which not only ensures the file writing efficiency, but also allows data blocks belonging to one file to be stored in one disk. For example, all data blocks belonging to the file F1 are stored in the disk D1, and all data blocks belonging to the file F2 are stored in the disk D2. After multiple files are stored in the RAID by using the method in this embodiment of the present invention, when a file in a storage array needs to be accessed, the storage device 110 may not need to wake up all the disks in the RAID, but only needs to wake up a disk in which the file is stored and return the file in the disk to a host, thereby achieving a better energy saving effect. In addition, in the technical solution of this embodiment of the present invention, if a data block is damaged, the damaged data block may be restored by using a check block of the same stripe or data blocks of other files, thereby ensuring security of file storage.

It should be noted that the data block described in this embodiment of the present invention refers to a data unit formed by multiple pieces of data. The check block described in this embodiment of the present invention refers to a data unit formed by check data. The matrix described in this embodiment of the present invention may include multiple arrays formed by using data blocks, or may include multiple arrays formed by using data blocks and check blocks. The row in this embodiment of the present invention refers to one array that includes all data blocks belonging to one file. The column in this embodiment of the present invention refers to an array perpendicular to the row. In other words, the row defined in this embodiment of the present invention is not limited to a horizontal array that is defined in an ordinary matrix. When the horizontal array in the ordinary matrix includes data blocks belonging to one file, the horizontal array (for example, a horizontal array shown in FIG. 4C) may be called as the row in this embodiment of the present invention. When a vertical array in the ordinary matrix includes data blocks belonging to one file, the vertical array is called as the row in this embodiment of the present invention, which is not limited herein.

Figure 2B:
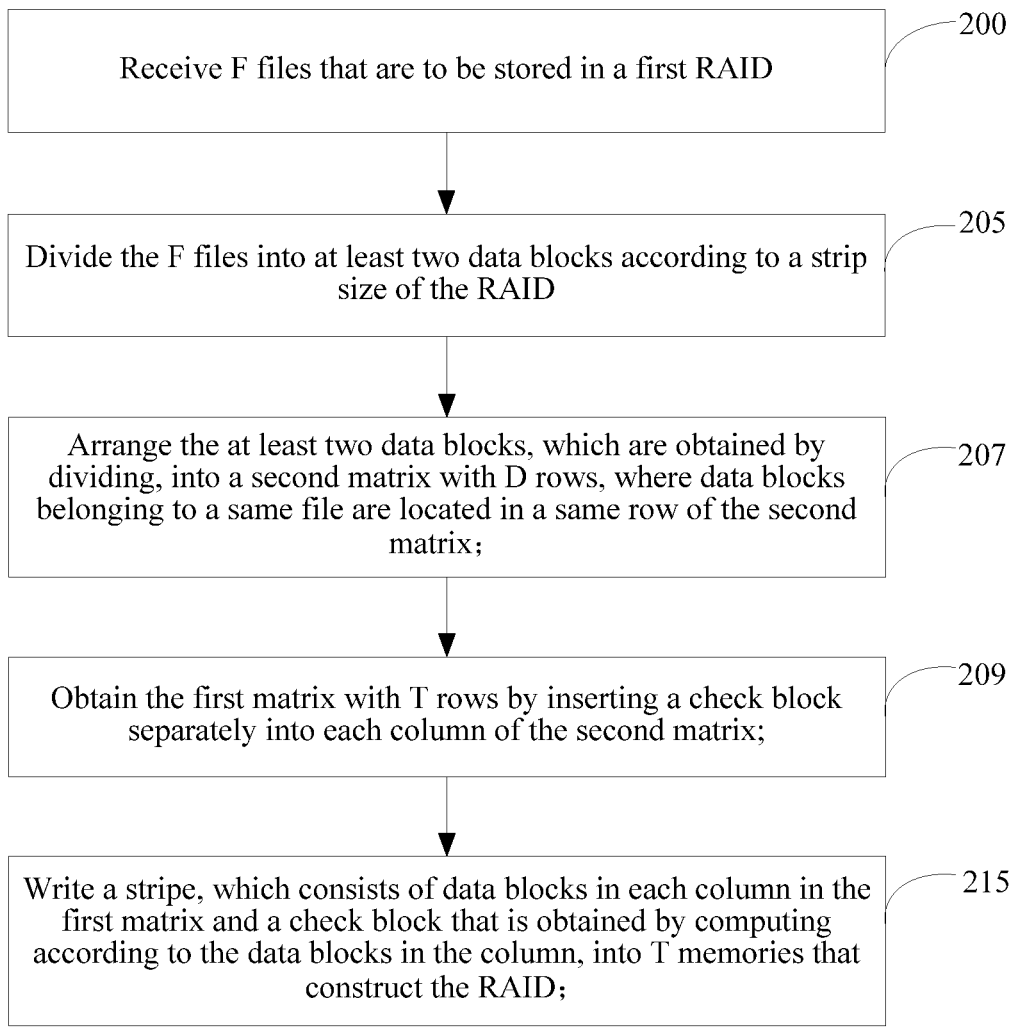
FIG. 2B is a flowchart of another file processing method according to an embodiment of the present invention.

FIG. 2B is a flowchart of another file processing method according to an embodiment of the present invention. The method may be executed by the controller 115 of the storage device 110 shown in FIG. 1B, and the method may be applied to a file archiving scenario. As shown in FIG. 2B, the method is similar to the method shown in FIG. 2A, where step 207 and step 209 are detailed descriptions of step 210 in the method shown in FIG. 2A. As shown in FIG. 2B, the method includes:

In step 200, the storage device 110 receives F files that are to be stored in a first RAID, where F is a natural number no less than 2, the first RAID includes T storage apparatuses, and a value of T is a natural number no less than 3.

In step 205, the storage device 110 divides the F files into at least two data blocks according to a strip size of the first RAID.

In step 207, the storage device 110 arranges the at least two data blocks into a second matrix with D rows, where data blocks belonging to one file are located in one row of the second matrix, and the D is the quantity of data disks in the first RAID.

After multiple data blocks are obtained by dividing the files, the obtained multiple data blocks may be arranged into a second matrix of D rows*N columns, where D is used to represent the quantity of rows of the second matrix, a value of D is determined according to the quantity of data disks that form the first RAID, and N is an integer. It may be understood that the quantity of data disks in the first RAID needs to be determined according to an organization form of the first RAID. For example, a RAID3 includes data disks and an independent check disk, and a RAID4 includes data disks and 2 independent check disks. Whereas, a RAID5 has data disks only, but no independent check disk. The value of D only needs to be determined according to the quantity of data disks in the first RAID. For example, if the organization form of the first RAID is the RAID3 and the first RAID includes a total of 4 disks, the quantity of data disks is 3 and the quantity of check disks is 1. Therefore, the quantity of rows in the second matrix is 3, which may be arranged into the second matrix shown in FIG. 4B. If the organization form of the first RAID is the RAID5 and the first RAID includes a total of 4 disks, the quantity of data disks is 4 and the quantity of check disks is 0. Therefore, the quantity of rows in the second matrix is 4, which may be arranged into the second matrix shown in FIG. 6A.

N is used to represent the quantity of columns in the second matrix, N is an integer, and a value of N may not be limited and may be specifically determined according to the quantity of data blocks. It may be understood that in a case in which received multiple to-be-stored files are buffered in the cache 120, the value of N may be determined according to a size of the cache 120, and a product of N and the strip size is not greater than a capacity of the cache 120. Specifically, a process of arranging the second matrix is similar to the method for arranging the first matrix which is described in step 210 of the foregoing FIG. 2A, and details are not repeatedly described herein.

It should be noted that the data disk in this embodiment of the present invention is merely an example of a data storage apparatus that stores a data block, and the independent check disk is merely an example of an independent check storage apparatus that is specially used for storing check data. The data storage apparatus in this embodiment of the present invention refers to a storage apparatus that is used for storing a data block, and the independent check storage apparatus refers to a storage apparatus that is specially used for storing a check block, where the storage apparatus includes but is not limited to an apparatus such as a magnetic disk, or a cabinet or server including a magnetic disk.

In this embodiment of the present invention, when data blocks are specifically arranged, it must be ensured that data blocks belonging to one file are located in one row of the second matrix. For example, as shown in FIG. 4B, if the organization form of the first RAID is the RAID3 and the first RAID includes 3 data disks, the data blocks obtained after dividing the files F1 to F5 may be arranged into a second matrix of 3 rows*7 columns, where the data blocks F1-1, F1-2, F1-3, F1-4, and F1-5 of the file F1 are all located in the $0^{th}$ row of the second matrix, the data blocks F2-1, F2-2, and F2-3 of the file F2 are all located in the $1^{st}$ row of the second matrix, and F5-1, F5-2, F5-3, and F5-4 of the file F5 are also located in the $1^{st}$ row of the second matrix.

In step 209, the storage device 110 obtains a first matrix with T rows by inserting a check block respectively into each column of the second matrix.

The check block inserted in each column of the second matrix is obtained by computing the data blocks in the column according to a check algorithm determined by the organization form of the first RAID, and a difference between the value of T and the value of D is the quantity of independent check disks in the first RAID. For example, the first matrix with T rows may be a first matrix of (D+P) rows*M columns, where P is the quantity of check disks in the first RAID, M is an integer no less than N, and a product of M and the strip size is not greater than a capacity of a single disk in the RAID.

The controller 115 of the storage device 110 may determine a check algorithm (namely, a computation method of a check block) according to the organization form of the first RAID, and compute the check block of the data blocks in each column of the second matrix according to the determined check algorithm, and obtain a first matrix of (D+P) rows*M columns by inserting the check block of the data blocks in each column into the second matrix, where P is the quantity of independent check disks in the first RAID, a value of M should not be less than the value of N, and the product of M and the strip size is not greater than the capacity of the single disk in the RAID. It may be understood that in a case in which received multiple to-be-stored files are buffered in the cache 120, the product of M and the strip size is also not greater than the capacity of the cache 120.

It may be understood that in an actual operation, if the received multiple files are first buffered in a temporary storage area (that is, the cache 120), considering that the check block still needs to occupy a capacity of the temporary storage area, a condition for inserting a check block into the second matrix may be set, for example, setting a condition that when a data volume in the temporary storage area exceeds a set threshold, a check block is inserted into each column of the second matrix. Certainly, it may also be set that when a set storage time limit arrives, a check block is inserted into each column of the second matrix. The storage time limit is a preset time limit for writing a file into a disk that forms the first RAID. For example, it may be specified that storage is performed once an hour, and then the storage time limit is 1 hour. The storage time limit may be determined according to an actual situation such as a volume of data that needs to be written into a disk. Storage may be performed once a day or storage may be performed every 10 minutes, which is not limited herein.

In step 209, when a check block is inserted in the second matrix, different processing may be respectively performed according to the organization form of the first RAID. For details, reference may be made to related description of FIG. 3 and FIG. 5.

Figure 3:
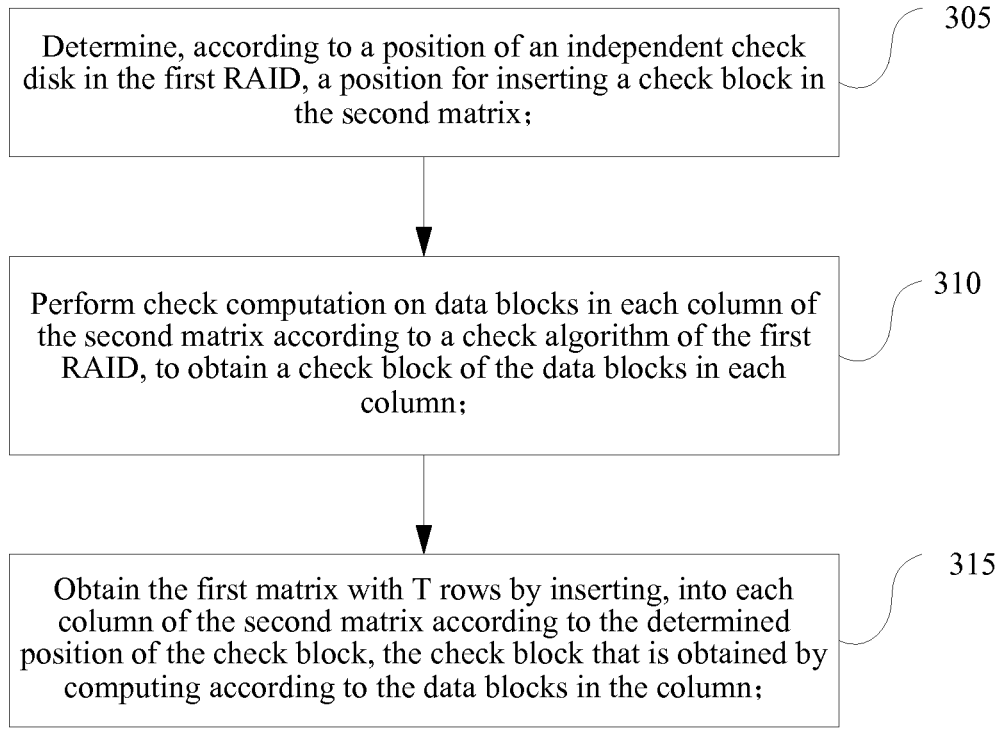
FIG. 3 is a flowchart of a method for inserting a check block in a file processing method according to an embodiment of the present invention.

In one case, when an organization form of the first RAID is a RAID with an independent check disk, for example, when the first RAID is the RAID3 or the RAID4, the controller 115 may insert a check block according to a process of the method shown in FIG. 3. As shown in FIG. 3, the method includes:

In step 305, the storage device 110 determines, according to a position of the independent check disk in the first RAID, a position for inserting a check block in the second matrix.

For example, if the first RAID is the RAID3, the first RAID has an independent check disk. As shown in FIG. 4D, if the first RAID has 4 disks, any one of the disks D1, D2, D3, and D4 may be used as the independent check disk. For example, D4 is used as the independent check disk in the first RAID shown in FIG. 4D. The position for inserting a check block in the second matrix may be determined according to a determined position of the independent check disk. For example, according to the position of the independent check disk D4 shown in FIG. 4D, it may be determined that a row of a check block is added after the last row of the second matrix shown in FIG. 4B. In this manner, the second matrix shown in FIG. 4B has 3 rows, and then the $4^{th}$ row is added to the second matrix to insert a check block.

Certainly, it may be understood that if D2 is used as the independent check disk, a row is inserted between a first row of data and a second row of data in the second matrix shown in FIG. 4B and used as the position of the check block, so that a second matrix of 3 rows*7 columns becomes a first matrix of 4 rows*7 columns. The foregoing example of the position of the independent check disk is not intended to constitute any limitation to the position of the independent check disk.

In step 310, the storage device 110 performs check computation on data blocks in each column of the second matrix according to a check algorithm of the first RAID, to obtain a check block of the data blocks in each column.

For example, if the check algorithm of the first RAID is a parity check algorithm, check computation may be performed respectively on data in each column in the second matrix shown in FIG. 4B according to the parity check algorithm, to obtain the check block of the data blocks in each column. For example, check computation is performed according to the data blocks F1-1, F2-1, and F3-1 in the $0^{th}$ column shown in FIG. 4-B to obtain the check block P1. Check computation is performed according to the data blocks F1-2, F2-2, and F4-1 of the $1^{st}$ column to obtain the check block P2. It should be noted that in this embodiment, the parity check algorithm is merely an example but does not limit the check algorithm. A sequence of step 305 and step 310 is not limited.

In step 315, the storage device 110 obtains the first matrix with T rows by inserting, into each column of the second matrix according to the determined position of the check block, the check block that is obtained by computing according to the data blocks in the column.

For example, after a check block is inserted into the second matrix shown in FIG. 4B, a first matrix of 4 rows*7 columns shown in FIG. 4C may be obtained, where P1 is the check block obtained by computing according to the data blocks F1-1, F2-1, and F3-1 in the $0^{th}$ column in the second matrix, P2 is the check block obtained by computing according to the data blocks F1-2, F2-2, and F4-1 in the $1^{st}$ column in the second matrix, and so on.

In the case of an independent check disk, the quantity of check blocks to be inserted into each column of the second matrix may be determined according to the quantity of independent check disks. Therefore, after the check block is inserted, the quantity of rows in the second matrix changes, but the quantity of columns in the second matrix remains unchanged. In other words, if the organization form of the first RAID is a RAID with an independent check disk, the value of M in the first matrix equals the value of N in the second matrix.

Figure 5:
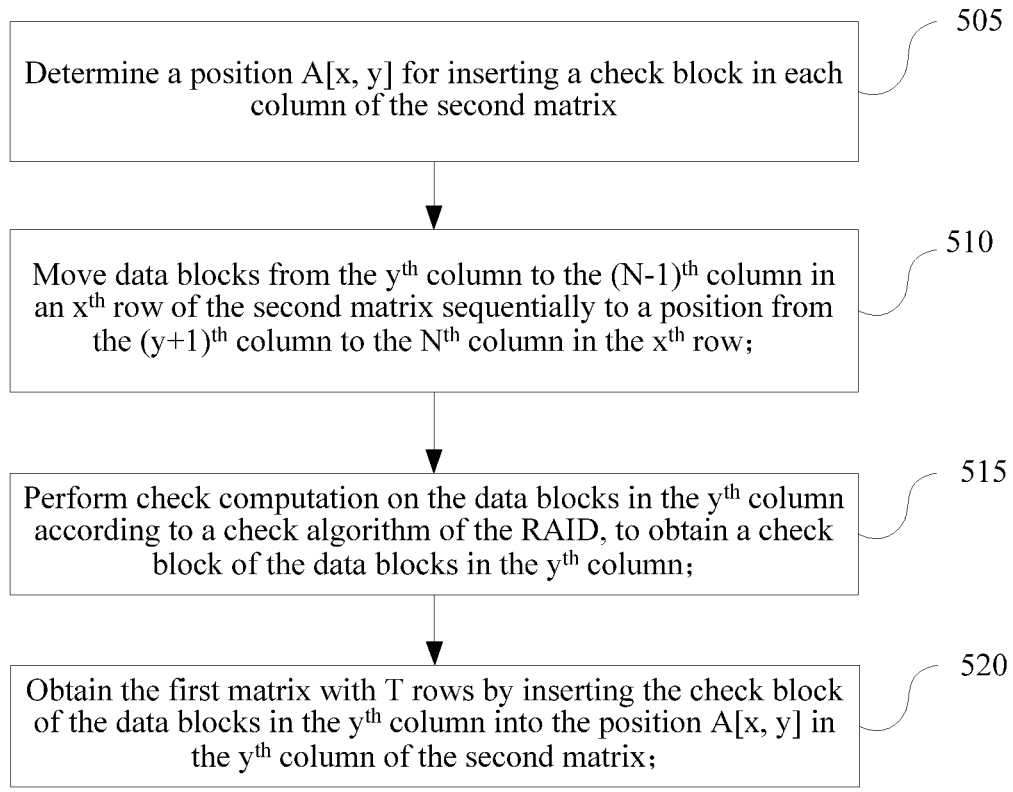
FIG. 5 is a flowchart of another method for inserting a check block in a file processing method according to an embodiment of the present invention.

In another case, when the organization form of the first RAID is not a RAID with an independent check disk but a RAID with a distributed check block, for example, when the first RAID is a RAID5 or a RAID6, the controller 115 may insert a check block according to a process of the method shown in FIG. 5. As shown in FIG. 5, the method includes:

In step 505, the storage device 110 determines a position A[x, y] for inserting a check block in each column of the second matrix.

In an actual application, according to an organization form of the first RAID and a distribution manner of a check block in the first RAID, the position A[x, y] for inserting a check block in each column of the second matrix may be determined. Persons skilled in the art may know that a distribution manner of a check block on a disk in the RAID5 may be left synchronous (backward parity or Left Synchronous), left asynchronous (backward dynamic or Left Asynchronous), right synchronous (forward parity or Right Synchronous), or right asynchronous (forward dynamic or Right Asynchronous). "Left" or "right" indicates how check information is distributed, and "synchronous" or "asynchronous" indicates how the data is distributed. In an algorithm of "left", starting from the last disk, a check block is moved one disk position in each stripe in a direction towards the first disk (to be distributed circularly and repeatedly if necessary). In an algorithm of "right", starting from the first disk, a check block is moved one disk position in each stripe in a direction towards the last disk (to be distributed circularly and repeatedly if necessary). The RAID6 is added with another group of check blocks on a basis of the RAID5.

In an organization form of a RAID that has no independent check disk, how a check block is specifically distributed in a disk may be determined according to an organization form of the first RAID and the distribution manner of the check block. For example, if the organization form of the first RAID is the RAID5 and the distribution manner of the check block is left synchronous, it may be known that the check block is distributed in the disk in a manner that, starting from the last disk, the check block is moved one disk position in each stripe in the direction towards the position of the first disk.

In this embodiment of the present invention, the position A[x, y] for inserting a check block in the second matrix may be determined according to the distribution manner of the check block in the first RAID, where x is an integer no less than 0 and no greater than (D−1), and y is an integer no less than 0 and no greater than (N−1), that is, 0≤x≤(D−1), 0≤y≤(N−1). In addition, values of x and y change with a different position of the check block in the second matrix, a value of x increases progressively from 0 to (D−1), and a value of y increases progressively from 0 to (N−1). For example, if the organization form of the first RAID is the RAID 5 and the distribution manner of the check block is left synchronous, as shown in FIG. 6A, a position for inserting a check block in the $0^{th}$ column of the second matrix is A[3, 0], a position for inserting a check block in the $1^{st}$ column is A[2, 1], a position for inserting a check block in the $2^{nd}$ column is A[1, 2], and a position for inserting a check block in the $3^{rd}$ column is A[0, 3]. A next circulation begins from the $4^{th}$ column, that is, a position for inserting a check block in the $4^{th}$ column is A[3, 4], a position for inserting a check block in the $5^{th}$ column is A[2, 5], and so on. Specifically, positions may be P1-P7 shown in FIG. 6B.

In step 510, the storage device 110 sequentially moves data from the $y^{th}$ column to the $(N-1)^{th}$ column in the $x^{th}$ row of the second matrix to a position from the $(y+1)^{th}$ column to the $N^{th}$ column in the $x^{th}$ row.

After the position A[x, y] for inserting a check block in each column of the second matrix is determined, data blocks from the $y^{th}$ column to the $(N-1)^{th}$ column in the $x^{th}$ row of the second matrix need to be moved sequentially to the positions from the $(y+1)^{th}$ column to the $N^{th}$ column of the $x^{th}$ row, that is, all data blocks in the original positions A[x, y] to A[x, N−1] need to be moved towards the right by one position and sequentially moved to the positions A[x, y+1] to A[x, N]. For example, when the position for inserting a check block in the $0^{th}$ column of the second matrix shown in FIG. 6A is determined to be A[3, 0], all data blocks in the positions A[3, 0] to A[3, 4] in the $3^{rd}$ row of the second matrix need to be moved backward by one position and sequentially moved to the positions of A[3, 1] to A[3, 5]. In this manner, the data block F4-1 in the original position A[3, 0] may be moved to A[3, 1], the data block F4-2 in the original position A[3, 1] may be moved to A[3, 2], and so on. The values of x and y change with a different position of the check block in the second matrix, and each time a position A[x, y] of a check block is determined, all data blocks in the original positions A[x, y] to A[x, N−1] in the $x^{th}$ row need to be moved backward by one position. The quantity of data blocks in each column is not limited in this embodiment of the present invention.

In step 515, the storage device 110 performs check computation on the data blocks in the $y^{th}$ column according to a check algorithm of the first RAID, to obtain a check block of the data blocks in the $y^{th}$ column.

After the position of the check block is determined to be A[x, y], and data blocks from the $y^{th}$ column to the $(N-1)^{th}$ column in the $x^{th}$ row of the second matrix is moved sequentially to the positions from the $(y+1)^{th}$ column to the $N^{th}$ column of the $x^{th}$ row, check computation may be performed on the data blocks in the $y^{th}$ column according to the check algorithm of the first RAID to obtain the check block of the data blocks in the $y^{th}$ column. The check block is a check block that needs to be inserted into the position of A[x, y]. For example, as shown in FIG. 6B, when the position of the check block in the $0^{th}$ column is determined to be A[3, 0], and the data block F4-1 in the original position A[3, 0] in the second matrix is moved to the position A[3, 1], the check block P1 in the $0^{th}$ column may be obtained by computing according to new data blocks F1-1, F2-1, and F3-1 in the $0^{th}$ column.

In step 520, the storage device 110 obtains the first matrix with T rows by inserting the check block of the data blocks in the $y^{th}$ column into the position A[x, y] in the $y^{th}$ column of the second matrix.

After the check block is obtained by computing, the check block may be inserted into the position A[x, y] of the determined check block, so that the first matrix with T rows can be obtained. For example, a first matrix of (D+P) rows*M columns may be obtained. In the organization form of the RAID that has no independent check disk, a check block needs to be inserted into each column of the second matrix, and an original data block in the position in which the check block is inserted needs to be moved backward sequentially; therefore, the value of M in the obtained first matrix is greater than the value of N in the second matrix. For example, if the organization form of the first RAID is the RAID5 and the check block is distributed in a left synchronous manner, a first matrix of 4 rows*7 columns shown in FIG. 6B may be obtained after a check block is inserted into each column of the second matrix of 4 rows*5 columns shown in FIG. 6A.

In step 215, the storage device 110 writes a stripe, which consists of data blocks in each column in the first matrix and a check block that is obtained by computing according to the data blocks in the column, into the disks that form the first RAID. In an actual application, in step 215, when the data blocks in each column of the first matrix are written, in a form of a stripe, into the disks that form the first RAID, the following situations may occur and may be processed respectively.

In one case, when the stripe, which consists of the data blocks and the check block in the $y^{th}$ column of the first matrix, is fully occupied, the data blocks and the check block in the $y^{th}$ column may be directly written into the disks that form the first RAID, where the $y^{th}$ column is one of the M columns in the first matrix. For example, when the $0^{th}$ column shown in FIG. 6B is fully occupied, that is, the stripe, which consists of the data blocks and the check block in the $0^{th}$ column, is fully occupied, the stripe, which consists of the data blocks and the check block in the $0^{th}$ column, is written into the disks.

In another case, if the stripe, which consists of the data blocks and the check block in the $y^{th}$ column of the first matrix, is not fully occupied, 0s may be filled in a position without data blocks in the $y^{th}$ column. A stripe, which consists of the data blocks in the $y^{th}$ column after filling with 0s and the check block, is written into the disks that form the first RAID, where the $y^{th}$ column is a column in the first matrix. For example, when the $4^{th}$ column in the first matrix shown in FIG. 6B is not fully occupied, that is, no data is written in the position A[1, 4], 0s may be filled in the position A[1, 4]. Then, a stripe, which consists of the data blocks and the check block in the $4^{th}$ column, is written into the disks, that is, a stripe, which consists of the data blocks F1-4, 0, and F5-3, and the check block P5, is written into the disks.

Figure 7:
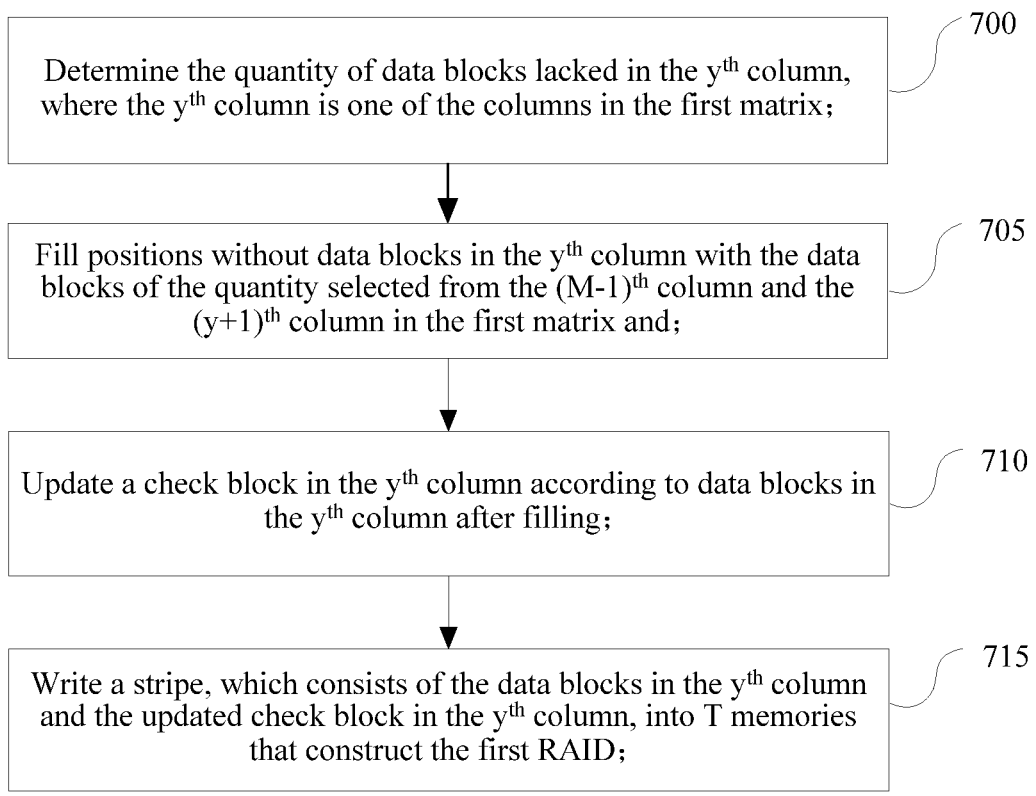
FIG. 7 is a flowchart of a method for writing data into disks that form a RAID in a file processing method according to an embodiment of the present invention.

In still another case, when the stripe, which consists of the data blocks and the check block in the $y^{th}$ column of the first matrix, is not fully occupied, and if a storage time limit arrives, and no other files is received, a method shown in FIG. 7 may be used for processing. As shown in FIG. 7, the method includes:

In step 700, the storage device 110 determines the quantity of data blocks lacked in the $y^{th}$ column.

For example, the stripe, which consists of the data blocks and the check block in the $5^{th}$ column in the first matrix shown in FIG. 4C, is not fully occupied. For example, that is, in the $5^{th}$ column, there is a position A[0, 5] in which no data is written; for another example, in the $y(y=4)^{th}$ column of the first matrix shown in FIG. 6B, there is also a position A[1, 4] in which no data is written. If the storage time limit arrives at that time, it may be determined that the quantity of data blocks lacked in the $5^{th}$ column of the first matrix shown in FIG. 4C is 1, and the quantity of data blocks lacked in the $4^{th}$ column of the first matrix shown in FIG. 6B is also 1.

In step 705, the storage device 110 selects data blocks of the quantity from the $(M-1)^{th}$ column to the $(y+1)^{th}$ column in the first matrix and fills positions without data blocks in the $y^{th}$ column with the data blocks.

If in the $y^{th}$ column, there is a position without data block, the storage time limit arrives, and the storage device 110 does not receive any other to-be-stored files from the host, in order to save storage space of a disk, the storage device 110 may sequentially select data blocks of the corresponding quantity from the $(M-1)^{th}$ column to $(y+1)^{th}$ column in the first matrix and fill positions without data blocks in the $y^{th}$ column with the data blocks. In other words, when it is determined that in the $y^{th}$ column in the first matrix, there is a position without data block, the storage device 110 may select, starting from the last column of the first matrix, data blocks of the corresponding quantity according to a direction from the last column to the $0^{th}$ column and fill positions without data blocks in the $y^{th}$ column with the data blocks.

For example, the storage device 110 may select the data block F5-4 from the $6^{th}$ column of the first matrix shown in FIG. 4C, and fill, with the data block, in a position lacking a data block in the $5^{th}$ column, that is, the position A[0, 5] is filled with the data blocks F5-4 in the position A[1, 6] in the first matrix. The storage device 110 may select any data block (namely, the data blocks F5-4 and F5-5) in the $6^{th}$ column of the first matrix shown in FIG. 6B, and fill the position A[1, 4] of the $4^{th}$ column with the data block.

In step 710, the storage device 110 updates the check block in the $y^{th}$ column according to the data blocks in the $y^{th}$ column after filling.

Figure 6D:
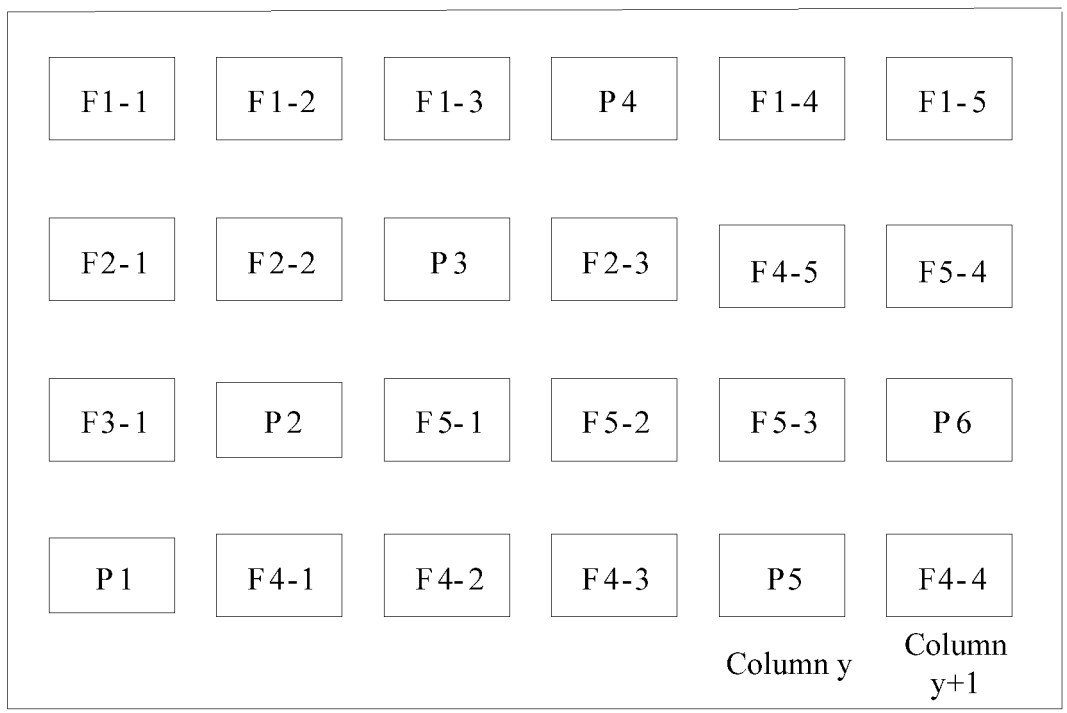

Because the positions without data blocks in the $y^{th}$ column are filled with new data, the storage device 110 needs to compute and update the check block in the $y^{th}$ column according to the determined check algorithm and all data blocks in the $y^{th}$ column of the first matrix after filling. A value of y changes with a different position lacking a data block in the first matrix. For example, as shown in FIG. 6B, if the $y^{th}$ column is filled with the data block F4-5 in the $(M-1)^{th}$ column shown in FIG. 6B, data in the $y^{th}$ column after filling may, as shown in the data blocks in the $y^{th}$ column in FIG. 6D, need to be recomputed according to the data blocks F1-4, F4-5, and F5-3 in the $y^{th}$ column after filling, to update the check block P5. It may be understood that because there is also a position without any data block in the (y+1)$^{th}$ column of the first matrix shown in FIG. 6B, the storage device 110 may also select one piece of data from the (M−1)$^{th}$ column, fill the position without data blocks in the (y+1)$^{th}$ column with the one data block, and then re-compute and update the check block P6 according to updated data blocks F1-5, F5-4, and F4-4 in the (y+1)$^{th}$ column.

In step 715, the storage device 110 writes a stripe, which consists of the data blocks and the check block in the y$^{th}$ column, into T disks that form the first RAID.

When a position lacking a data block in the y$^{th}$ column of the first matrix is filled with a new data block, and the check block in the y$^{th}$ column is updated, the storage device 110 may write a stripe, which consists of updated data blocks in the y$^{th}$ column and the check block, into the T disks.

It may be understood that when there is still a position without data blocks in the first matrix after the method shown in FIG. 7 is used, if the storage time limit arrives, a data block without data may be filled with 0s before the stripe is written into the disks. For details, reference may be made to the foregoing description, and details are not repeatedly described herein. Persons skilled in the art may know that filling a data block without data with 0s is used to indicate that the data block is not used.

It can be known from the foregoing description that when the data blocks in the first matrix are written into the disks, by using the method shown in FIG. 7, it can be ensured that one file is stored in as fewer disks as possible, and disk space can be saved.

In yet another situation, when a file is stored by using the method described in FIG. 2A or FIG. 2B, if the storage time limit arrives and the first RAID is already full, data that is in the first matrix and has not been written into the first RAID may be written into the second RAID. It may be understood that when the data that has not been written into the first RAID is written into the second RAID, if the organization form of the second RAID is the same as that of the first RAID, and the quantity of member disks in the second matrix is the same as that in the first matrix, for example, both the first RAID and the second RAID are the RAID5, and the quantity of member disks in the second RAID is the same as that of the first RAID. The data that is in the first matrix and has not been written into the first RAID may be written, according to the method of step 215, into disks that form the second RAID. If the organization form of the second RAID is different from that of the first RAID, or the quantity of member disks in the second matrix is different from that in the first matrix, for example, the first RAID is the RAID3, and the second RAID is the RAID5, remaining data blocks need to be written into the second RAID again according to the foregoing file processing method.

Figures 8, 9:
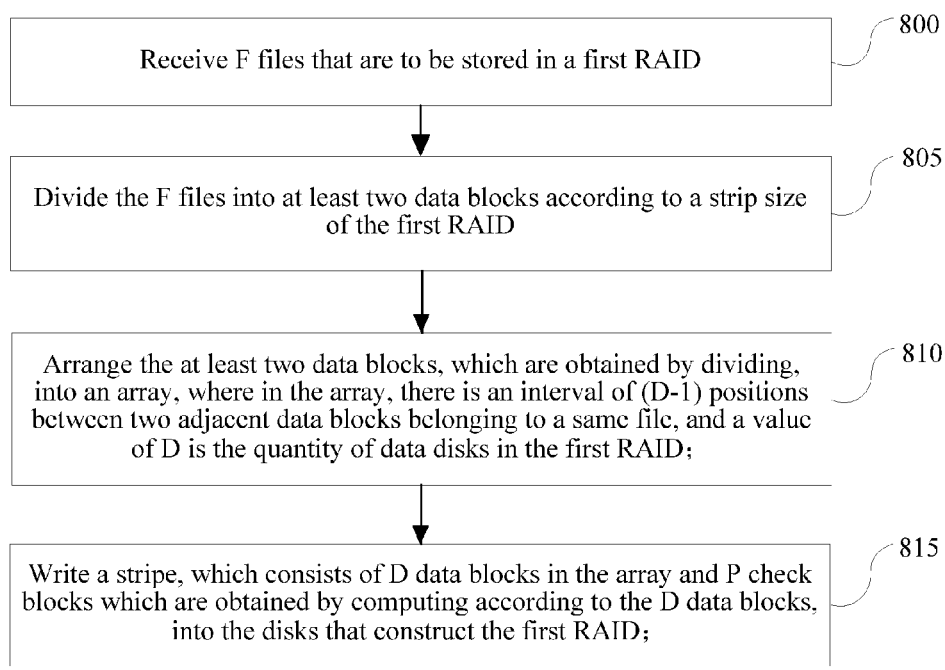
FIG. 8 is a flowchart of still another file processing method according to an embodiment of the present invention.
FIG. 9 is a schematic diagram of still another arrangement of data blocks of to-be-stored files according to an embodiment of the present invention.

FIG. 8 is a flowchart of another file processing method according to an embodiment of the present invention. This method can be applied only to an organization form of a RAID with an independent check disk. This method may also be executed by the storage device 110 shown in FIG. 1A. As shown in FIG. 8, the method includes:

In step 800, the storage device 110 receives F files that are to be stored in a first RAID.

In step 805, the storage device 110 divides the F files into at least two data blocks according to a strip size of the first RAID.

For a related description of step 800 and step 805, reference may be made to a related description of step 200 and step 205 in FIG. 2A.

In step 810, the storage device 110 arranges, into one array, the at least two data blocks that are obtained by dividing. In the array, an interval of (D−1) positions is between two adjacent blocks belonging to one file, and a value of D is the quantity of data disks in the first RAID.

Specifically, when data blocks are arranged in the array, how to arrange the at least two data blocks needs to be determined according to the organization form of the first RAID and the quantity of data disks in the first RAID. When the organization form of the first RAID is a RAID with an independent check disk, for example, when the first RAID is a RAID3 or a RAID4, in the arranged array, two adjacent data blocks belonging to one file need to be spaced apart for (D−1) positions, where the value of D is the quantity of data disks in the first RAID. For example, with reference to FIG. 4D, the organization form of the RAID is the RAID3. The first RAID includes 4 disks, where D1, D2, and D3 are data disks, and D4 is an independent check disk. Data blocks obtained by dividing may be arranged into an array shown in FIG. 9. Data blocks F1-1 and F1-2 of a file F1 are spaced apart for two positions, data blocks F2-1 and F2-2 of a file F2 are also spaced apart for two positions, and so on.

In step 815, the storage device 110 writes a stripe, which consists of D data blocks in the array and P check blocks which are obtained by computing according to the D data blocks, into the disks that form the first RAID, where a value of P is the quantity of independent check disks in the first RAID.

Specifically, in a process of storing the data blocks in the disks that form the first RAID, check computation needs to be performed, according to a check algorithm of the first RAID, on the D pieces of data selected sequentially from the data group, to obtain P check blocks. A stripe sequentially consists of the D pieces of data and the P check blocks obtained by computing, and is written into the disks that form the first RAID. Persons skilled in the art may know that when a check block is written into a disk, the check block needs to be written into the independent check disk in the first RAID. For example, after data in the first array shown in FIG. 9 is written into disks, a storage structure shown in FIG. 4D may be obtained.

By using the file processing method shown in FIG. 8, files can be concurrently written into a RAID, thereby ensuring the file writing efficiency and ensuring that one file is stored in one disk. In addition, a stripe consists of data blocks of different files; and when a file is damaged, the damaged file may be restored according to other files, which ensures security of file storage.

Figure 10:
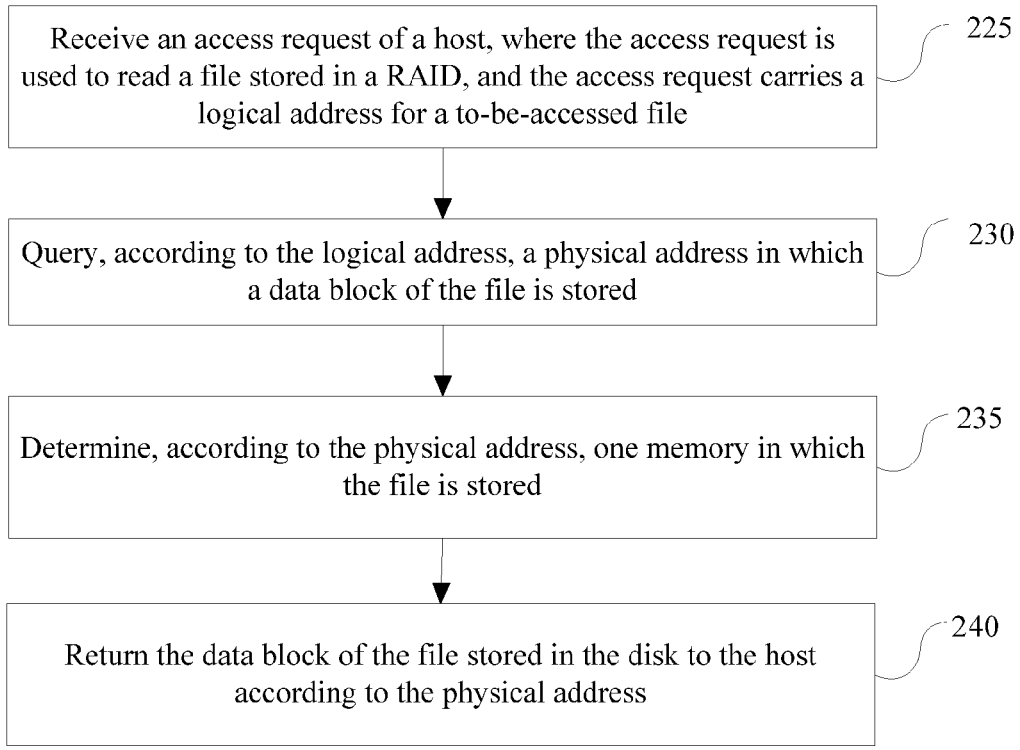
FIG. 10 is a schematic flowchart of a file reading method according to an embodiment of the present invention.

In this embodiment of the present invention, after a file is stored in a disk that forms a RAID by using the file processing method shown in the foregoing FIG. 2A, FIG. 2B, or FIG. 8, and in an archiving scenario, the stored file is accessed at a relatively low frequency. Therefore, to achieve an energy saving objective, the disk is generally brought into a dormant or power-off state. When a file needs to be read, the file may be read according to the method described in FIG. 10. The following describes FIG. 10 with reference to FIG. 1A and FIG. 1B. The method includes:

In step 225, the storage device 110 receives an access request of the host 100, where the access request is used to read a file stored in the RAID, and the access request carries a logical address for a to-be-read file. It may be understood that the access request may also carry a file name of a to-be-accessed file.

In step 230, the storage device 110 queries, according to the logical address, a physical address in which a data block of the file is stored. Generally, after the storage device 110 stores data, a mapping table of a mapping relationship between the physical address and the logical address for storing data is formed. After receiving the access request for reading a file, the storage device 110 may check the mapping table according to the logical address carried in the access request, so as to query the physical address of the data in the disk. It may be understood that in the RAID, a mapping table may be formed both for data in the cache 120 and for data in the disk 130. When a physical address is queried, generally, the mapping table of the cache 120 may be first queried and then the mapping table of the disk 130 is queried. If data is in the cache, the data in the cache is directly returned to the host.

In step 235, the storage device 110 determines, according to the physical address, a disk for storing the file. In this embodiment of the present invention, after a file is stored, by using the file processing method in the foregoing embodiments, in a disk that forms a RAID, one file can be stored in one disk. Therefore, in this step, the storage device 110 can determine one disk for storing the file according to a physical address.

In step 240, the storage device 110 returns data blocks of the file stored in the disk to the host 100. Specifically, the storage device 110 may wake up, according to the physical address, a disk 130 in which the file is located, read data in the disk 130 according to the obtained physical address, and return the data to the host 100.

In this embodiment of the present invention, because a file is stored according to the method shown in FIG. 2A, FIG. 2B, or FIG. 8, data belonging to one file are stored in as fewer disks as possible. Therefore, when a file is read, only one disk in which the file is stored needs to be woken up, and data of the file is read from the one disk that is woken up, and returned to the host, with no need to wake up all disks that form the entire RAID, thereby resulting in an evident energy saving effect.

Persons skilled in the art may understand that, in this embodiment of the present invention, a disk for storing metadata and the cache 120 always remain in a power-on state, so as to make a timely response to an access request of the host. Persons skilled in the art may know that the metadata is data that describes data stored in a RAID and an environment of the data, for example, the metadata may include a mapping relationship between a logical address and a physical address.

Frequent power-on or power-off of a disk may affect the energy saving effect of a storage system, and may also affect a life time of the disk. Therefore, to avoid the disk from being frequently powered on or powered off, the disk may be graded in an actual application. A small quantity of high-performance disks remain in a power-on state all the time, while a large quantity of high-capacity disks enter an energy saving state. A high-performance disk herein refers to a disk with a relatively low access delay or a disk with a relatively large quantity of input/output operations per second (IOPS), for example a solid state disk (SSD). A high-capacity disk refers to a disk with a relatively large capacity. After storage, according to a file access condition, a file with a high access frequency may be moved to a small quantity of reserved high-performance disks that remain in a power-on state all the time, so as to reduce the quantity of times that a disk is powered on or woken up, and improve a response speed.

Further, to avoid a disk from being frequently powered on or powered off, the storage system in this embodiment of the present invention may also provide a warning mechanism and a protection mechanism. Statistics are collected on the quantity of accumulated times that each disk in the RAID is powered on and powered off. When the quantity of times of powering on and powering off a disk within a preset period of time exceeds a preset threshold, the system provides a prompt or a warning, and may take some protection measures. A set threshold, for example, may be 10 times/day or 100 times/month. A protection measure may be set as performing no power-on or power-off operation on the disk in a set time, and so on, which is not limited herein.

Figure 11:
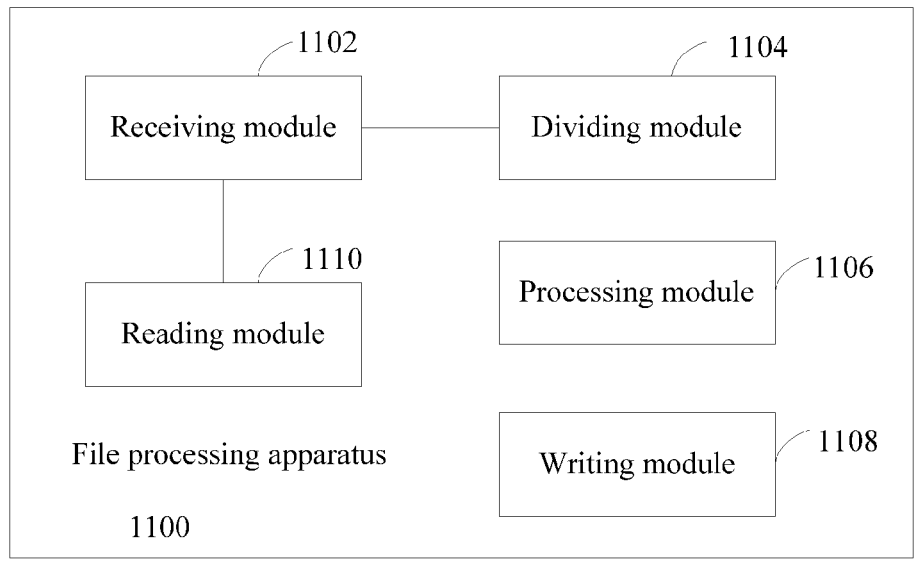
FIG. 11 is a schematic structural diagram of a file processing apparatus according to an embodiment of the present invention.

FIG. 11 is a schematic structural diagram of a file processing apparatus according to an embodiment of the present invention. As shown in FIG. 11, the file processing apparatus 1100 includes:

a receiving module 1102, configured to receive F files that are to be stored in a RAID, where the RAID is formed by T storage apparatuses, F is a natural number no less than 2, and T is a natural number no less than 3;

a dividing module 1104, configured to divide the F files into at least two data blocks according to a strip size of the RAID;

a processing module 1106, configured to obtain a first matrix with T rows according to the at least two data blocks, where data blocks belonging to one file are located in one row in the first matrix; and a writing module 1108, configured to write a stripe, which consists of data blocks in each column in the first matrix and a check block that is obtained by computing according to the data blocks in the column, into the T storage apparatuses that form the RAID.

Specifically, the processing module 1106 is configured to:

arrange the at least two data blocks, which are obtained by dividing, into a second matrix with D rows, where data blocks belonging to one file are located in one row of the second matrix, and D is the quantity of data storage apparatuses in the RAID; and obtain the first matrix with T rows by inserting a check block respectively into each column of the second matrix, where the inserted check block is obtained by computing according to data blocks in a column in which the check block in the first matrix is located.

In one case, when the RAID includes an independent check storage apparatus, the processing module is specifically configured to:

determine, according to a position of the independent check storage apparatus in the RAID, a position for inserting a check block in the second matrix;

perform computation on the data blocks in each column of the second matrix according to a check algorithm of the RAID, to obtain a check block of the data blocks in each column; and obtain the first matrix with T rows by inserting, into each column of the second matrix according to the determined position of the check block, the check block that is obtained by computing according to the data blocks in the column.

In another case, when the RAID does not include an independent check storage apparatus, the processing module is specifically configured to:

determine a position $A[x, y]$ for inserting a check block in each column of the second matrix, where the second matrix has N columns, x and y are both integers, a value of x increases progressively from 0 to D−1, and a value of y increases progressively from 0 to N−1;

move data blocks from the $y^{th}$ column to the $(N-1)^{th}$ column in the $x^{th}$ row of the second matrix sequentially to a position from the $(y+1)^{th}$ column to the $N^{th}$ column in the $x^{th}$ row;

perform check computation on the data blocks in the $y^{th}$ column according to a check algorithm of the RAID, to obtain a check block of the data blocks in the $y^{th}$ column; and obtain the first matrix with T rows by inserting the check block of the data blocks in the $y^{th}$ column into the position A[x, y] in the $y^{th}$ column of the second matrix.

In one case, the writing module 1108 is specifically configured to:

when a stripe, which consists of the data blocks in the $y^{th}$ column of the first matrix and the check block that is obtained by computing according to the data blocks in the $y^{th}$ column, is fully occupied, write the data blocks in the $y^{th}$ column and the check block into the T storage apparatuses that form the RAID, where the $y^{th}$ column is one of the columns in the first matrix.

In another case, the writing module 1108 is specifically configured to:

when a stripe, which consists of the data blocks in the $y^{th}$ column of the first matrix and the check block that is obtained by computing according to the data blocks in the $y^{th}$ column, is not fully occupied, determine the quantity of data blocks lacked in the $y^{th}$ column, where the $y^{th}$ column is one of the columns in the first matrix;

select data blocks of the quantity from the $(M-1)^{th}$ column to the $(y+1)^{th}$ column in the first matrix and fill positions without data blocks in the $y^{th}$ column with the data blocks;

update the check block in the $y^{th}$ column according to the data blocks in the $y^{th}$ column after filling; and write a stripe, which consists of the data blocks in the $y^{th}$ column and an updated check block in the $y^{th}$ column, into the T storage apparatuses that form the RAID.

In still another case, the writing module 1108 is specifically configured to:

when a stripe, which consists of the data blocks in the $y^{th}$ column of the first matrix and the check block that is obtained by computing according to the data blocks in the $y^{th}$ column, is not fully occupied, fill a position without data blocks in the $y^{th}$ column with 0s, and write a stripe, which consists of the data blocks in the $y^{th}$ column after filling with 0s and the check block, into storage apparatuses that form the first RAID, where the $y^{th}$ column is one of the columns in the first matrix.

Further, in yet another case, the receiving module 1102 may be further configured to receive an access request of a host, where the access request is used to read a file stored in the RAID, and the access request carries a logical address for a to-be-accessed file; and the file processing apparatus further includes:

a reading module 1110, configured to query, according to the logical address, a physical address in which a data block of the file is stored; determine, according to the physical address, one storage apparatus in which the file is stored; and return the data block of the file stored in the storage apparatus to the host.

The file processing apparatus provided in this embodiment of the present invention may be disposed in the controller described in the foregoing embodiments, and is configured to execute the file processing methods described in the foregoing embodiments. For a detailed description of functions of each unit, reference may be made to the description of the method embodiments, and details are not repeatedly described herein.

The file processing apparatus described in this embodiment of the present invention can store data belonging to one file in one disk. In addition, the file processing apparatus described in this embodiment of the present invention can form a stripe by using data blocks of different files and write the stripe into a disk. When a data block is damaged, the file processing apparatus can restore the damaged data block by using a check block of the same stripe or data blocks of other files, thereby improving security of file storage. Further, when reading a file, the file processing apparatus described in this embodiment of the present invention needs to wake up or power on only one disk in which the file is stored, read data of the file from the disk, and return the data to the host, with no need to wake up or power on all disks in the RAID, thereby achieving a better energy saving effect.

This embodiment of the present invention further provides a computer program product for data processing, including a computer readable storage medium stored with program code, where an instruction included in the program code is used to execute the method process described in any one of the foregoing method embodiments. Persons of ordinary skill in the art may understand that the foregoing storage medium may include any non-transitory machine-readable medium capable of storing program code, such as a USB flash drive, a removable hard disk, a magnetic disk, an optical disc, a random-access memory (RAM), a solid state disk (SSD), or a non-volatile memory.

In the several embodiments provided in the present application, it should be understood that the disclosed apparatus and method may be implemented in other manners. For example, the apparatus embodiment described above is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented through some communication interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. A part or all of the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A file processing method performed by a storage device for storing a file in a redundant array of independent disks (RAID), comprising:

receiving F files that are to be stored in the RAID, wherein the RAID is formed by T disks, and T is no less than 3, F is no less than T−1;

dividing each of the F files into one or more data blocks;

obtaining a first matrix with T rows and multiple columns according to data blocks of the F files, wherein all data blocks of each of the F files are contained in one and only one row of the first matrix such that all the data blocks of said each file do not appear in different rows of the matrix, each column of the first matrix comprises a plurality data blocks and a check block computed from the data blocks in said each column, and no two data blocks of said each column belong to a same file; and writing stripes into the T disks that form the RAID, wherein each of the stripes is based on a corresponding column of the first matrix and comprises the data blocks and check block in the corresponding column.

2. The file processing method according to claim 1, wherein the RAID comprises an independent check disk, and the step of obtaining the first matrix comprises:

constructing a second matrix with D rows according to the data blocks of the F files, wherein all data blocks of each of F files are contained in one and only one row of the second matrix such that all the data blocks of the each file do not appear in different rows, and wherein the D is quantity number of data disks in the RAID;

determining, according to a position of the independent check disk in the RAID, a position for inserting a check block in the second matrix;

performing check computation on the data blocks in each column of the second matrix according to a check algorithm of the RAID, to obtain a check block of the data blocks in each column; and obtaining the first matrix with T rows by inserting, into each column of the second matrix according to the determined position of the check block, the check block that is obtained by computing the data blocks in the column.

3. The file processing method according to claim 1, wherein the RAID does not comprise an independent check disk, and the obtaining the first matrix comprises:

constructing a second matrix with D rows according to the data blocks of the F files, wherein all data blocks of each of F files are contained in one and only one row of the second matrix such that all the data blocks of the each file do not appear in different rows, and wherein the D is equal to T;

determining a position A[x, y] for inserting a check block in each column of the second matrix, wherein the second matrix has N columns, wherein x and y are both integers, wherein a value of x increases progressively from 0 to D−1, and wherein a value of y increases progressively from 0 to N−1;

obtaining the first matrix, wherein data blocks from the $0^{th}$ column to the $(y-1)^{th}$ column in the $x^{th}$ row of the first matrix respectively reference to data blocks from the $0^{th}$ column to the $(y-1)^{th}$ column in the $x^{th}$ row of the second matrix, and data blocks from the $(y+1)^{th}$ column to the $N^{th}$ column in the $x^{th}$ row of the first matrix respectively reference to data blocks from the $y^{th}$ column to the $(N-1)^{th}$ column in the $x^{th}$ row of the second matrix;

performing a check computation on the data blocks in a $y^{th}$ column of the first matrix according to a check algorithm of the RAID to obtain a check block of the data blocks in the $y^{th}$ column of the first matrix; and inserting the check block of the data blocks in the $y^{th}$ column into the position A[x, y] in the $y^{th}$ column of the first matrix.

4. The file processing method according to claim 1, wherein the writing stripes into the T disks that form the RAID comprises:

writing a stripe comprising the data blocks and check block in the $y^{th}$ column of the first matrix into the T disks that form the RAID when the stripe, which comprises the data blocks and the check block in the $y^{th}$ column of the first matrix is fully occupied, wherein the $y^{th}$ column is one of the columns in the first matrix.

5. The file processing method according to claim 1, wherein the writing stripes into the T disks that form the RAID comprises:

filling a position without data blocks in the $y^{th}$ column with 0s when a stripe, which comprises the data blocks and the check block in the $y^{th}$ column of the first matrix is not fully occupied, and the stripe, which comprises the data blocks and the check block in the $y^{th}$ column after filling with 0s, into disks that form the RAID, wherein the $y^{th}$ column is one of the columns in the first matrix.

6. A file processing method for storing a file in a redundant array of independent disks (RAID), comprising:

receiving F files that are to be stored in the RAID, F is no less than 2;

dividing each of the F files into one or more data blocks;

obtaining an array according to data blocks of the F files, wherein two data blocks that belong to one file are arranged in the array with D−1 data blocks of a different file therebetween, and a value of D is the quantity of data disks in the RAID, F is no less than D; and writing stripes into disks that form the RAID, wherein each of the stripes comprises a sequence of D data blocks of the array and P check blocks which are obtained by computing the D data blocks, the sequence of D data blocks in each of the stripes respectively belong to different files of the F files, a value of P is the quantity of independent check disks in the RAID.

7. A storage device, comprising:

a redundant array of independent disks (RAID), configured to store a file, the RAID is formed by T disks, and T is no less than 3; and a communication interface, configured to communicate with a host and the RAID; and a processor, configured to:

receive F files that are to be stored in the RAID, F is no less than T−1;

divide each of the F files into one or more data blocks;

obtain a first matrix with T rows and multiple columns according to the data blocks of the F files, wherein all data blocks of each of the F files are contained in one and only one row of the first matrix such that all the data blocks of said each file do not appear in different rows of the first matrix, each column of the first matrix comprises multiple data blocks and a check block computed from the data blocks in said each column, and no two data blocks of said each column belong to a same file; and write stripes into the T disks that form the RAID, wherein each of the stripes is formed based on a corresponding column of the first matrix and comprises the data blocks and check block of the corresponding column.

8. The storage device according to claim 7, wherein when the RAID comprises an independent check disk, the operation of obtaining by the processor comprises:
- constructing a second matrix with D rows according to the data blocks of the F files, wherein all data blocks of each of F files are contained in one and only one row of the second matrix such that all the data blocks of the each file do not appear in different rows, and wherein the D is the quantity of data disks in the RAID;
- determining, according to a position of the independent check disk in the RAID, a position for inserting a check block in the second matrix;
- performing check computation on the data blocks in each column of the second matrix according to a check algorithm of the RAID, to obtain a check block of the data blocks in each column; and
- obtaining the first matrix with T rows by inserting, into each column of the second matrix according to the determined position of the check block, the check block that is obtained by computing the data blocks of the column.

9. The storage device according to claim 7, wherein when the RAID does not comprise an independent check disk, the operation of obtaining by the processor comprises:
- constructing a second matrix with D rows according to the data blocks of the F files, wherein all data blocks of each of F files are contained in one and only one row of the second matrix such that all the data blocks of the each file do not appear in different rows, and wherein the D is equal to T;
- determining a position A[x, y] for inserting a check block in each column of the second matrix, wherein the second matrix has N columns, wherein x and y are both integers, wherein a value of x increases progressively from 0 to D−1, and wherein a value of y increases progressively from 0 to N−1;
- obtaining the first matrix, wherein data blocks from the $0^{th}$ column to the $(y-1)^{th}$ column in the $x^{th}$ row of the first matrix respectively reference to data blocks from the $0^{th}$ column to the $(y-1)^{th}$ column in the $x^{th}$ row of the second matrix, and data blocks from the $(y+1)^{th}$ column to the $N^{th}$ column in the $x^{th}$ row of the first matrix respectively reference to data blocks from the $y^{th}$ column to the $(N-1)^{th}$ column in the $x^{th}$ row of the second matrix;
- performing a check computation on the data blocks in a $y^{th}$ column of the first matrix according to a check algorithm of the RAID, to obtain a check block of the data blocks in the $y^{th}$ column of the first matrix; and
- inserting the check block of the data blocks in the $y^{th}$ column into the position A[x, y] in the $y^{th}$ column of the first matrix.

10. The storage device according to claim 7, wherein the operation of writing by the processor comprises:
- writing a stripe comprising the data blocks and check block in the $y^{th}$ column of the first matrix into the T disks that form the RAID when the stripe, which comprises the data blocks and the check block in the $y^{th}$ column of the first matrix is fully occupied, wherein the $y^{th}$ column is one of the columns in the first matrix.

11. The storage device according to claim 7, wherein the operation of writing by the processor comprises:
- filling a position without data blocks in the $y^{th}$ column with 0s when a stripe, which comprises the data blocks and the check block in the $y^{th}$ column of the first matrix is not fully occupied, and
- writing the stripe, which comprises the data blocks and the check block in the $y^{th}$ column after filling with 0s, into disks that form the RAID, wherein the $y^{th}$ column is one of the columns in the first matrix.

12. A storage device comprising:
- a redundant array of independent disks (RAID), configured to store a file; and
- a controller, configured to
- receive F files that are to be stored in the RAID, F is no less than 2;
- divide each of the F files into one or more data blocks;
- obtaining an array according to data blocks of the F files, wherein two data blocks that belong to one file are arranged in the array with D−1 data blocks of a different file therebetween, and a value of the D is the quantity of data disks in the RAID, F is no less than D; and
- write stripes into disks that form the RAID, wherein each of the stripes comprises a sequence of D data blocks of the array and P check blocks which are obtained by computing the D data blocks, the sequence of D data blocks in each of the stripes respectively belong to different files of the F files, a value of the P is the quantity of independent check disks in the RAID.

* * * * *